US009564772B2

(12) United States Patent
Qiu et al.

(10) Patent No.: US 9,564,772 B2
(45) Date of Patent: Feb. 7, 2017

(54) CHARGING SYSTEM WITH ADAPTIVE POWER MANAGEMENT

(75) Inventors: Weihong Qiu, San Ramon, CA (US);
Xiaozhou Zhou, Fremont, CA (US);
Jun Liu, Sunnyvale, CA (US);
Bertram J. Rodgers, III, San Francisco, CA (US)

(73) Assignee: Intersil Americas LLC, Milpitas, CA (US)

(*) Notice: Subject to any disclaimer, the term of this patent is extended or adjusted under 35 U.S.C. 154(b) by 997 days.

(21) Appl. No.: 13/456,187

(22) Filed: Apr. 25, 2012

(65) Prior Publication Data
US 2012/0268063 A1   Oct. 25, 2012

Related U.S. Application Data

(63) Continuation-in-part of application No. 13/421,836, filed on Mar. 15, 2012, now abandoned.

(60) Provisional application No. 61/478,575, filed on Apr. 25, 2011, provisional application No. 61/604,226, filed on Feb. 28, 2012, provisional application No. 61/617,609, filed on Mar. 29, 2012.

(51) Int. Cl.
*H02J 7/00* (2006.01)
*H02J 7/02* (2016.01)
*H02J 7/04* (2006.01)

(52) U.S. Cl.
CPC ............... *H02J 7/022* (2013.01); *H02J 7/045* (2013.01)

(58) Field of Classification Search
CPC .................................................. Y10T 307/625
USPC ............................. 320/107, 128; 307/43, 48
See application file for complete search history.

(56) References Cited

U.S. PATENT DOCUMENTS

| 6,118,254 A * | 9/2000 | Faulk ................... H02J 7/0068 320/128 |
| 6,127,809 A | 10/2000 | Kates et al. |
| 6,144,187 A * | 11/2000 | Bryson ................ H02J 7/0068 320/137 |
| 6,300,744 B1 | 10/2001 | Shum |
| 6,928,568 B2 | 8/2005 | Breen et al. |
| 8,004,232 B2 | 8/2011 | Schultz |

(Continued)

OTHER PUBLICATIONS

J. Enslin, D. Snyman: Simplified Feed-Forward Control of the Maximum Power Point in PV Installations, Proceedings of the 1992 International Conference on Industrial Electronics, Control, Instrumentation, and Automation, 1992. pp: 548-553, vol. 1.

(Continued)

*Primary Examiner* — Richard Isla Rodas
*Assistant Examiner* — Johali Torres Ruiz
(74) *Attorney, Agent, or Firm* — Fogg & Powers LLC

(57) ABSTRACT

An embodiment of a charger may include an input, at least one switch having a first node coupled to a reference voltage, a current sensor coupled between the input and a second node of the at least one switch, an output coupled to a third node of the at least one switch, and a charge controller coupled to the input to determine an input voltage, to the current sensor to determine an input current and to control inputs of the at least one switch. The at least one switch may be responsive to control signals supplied by the charge controller to the control inputs thereof to control voltage and current at the output of the charger. The charge controller may be responsive to the input voltage and the input current to produce the control signals in a manner that maximizes electrical power drawn at the input.

20 Claims, 8 Drawing Sheets

(56) References Cited

U.S. PATENT DOCUMENTS

| | | |
|---|---|---|
| 2007/0007822 A1* | 1/2007 | Cioaca et al. .................. 307/29 |
| 2009/0027013 A1* | 1/2009 | Odaohhara ........... H02J 7/0068 320/160 |
| 2010/0207571 A1 | 8/2010 | English et al. |
| 2011/0109346 A1 | 5/2011 | Moussaoui et al. |

OTHER PUBLICATIONS

R. Faranda, S. Leva: Energy comparison of MPPT techniques for PV Systems, WSEAS Transactions on Power Systems; Issue 6, vol. 3, Jun. 2008, pp. 446-455.

T. Esram, P. L Chapman: Comparison of Photovoltaic Array Maximum Power Point Tracking Techniques, IEEE Transactions on Energy Conversion, vol. 22, No. 2, Jun. 2007; pp. 439-449.

Dave Freeman: Introduction to Photovoltaic Systems Maximum Power Point Tracking. Texas Instruments Application Report SLVA446—Nov. 2010.

A. S . Kislovski, R. Redl: Maximum-Power-Tracking Using Positive Feedback, Proc. 25th Annual IEEE Power Electron. Spec. Conf., 1994; pp. 1065-1068.

P. Midya, P. T. Krein, R. J. Turnbull, R. Reppa, and J. Kimball; Dynamic maximum power point tracker for photovoltaic applications, in Proc. 27th Annual IEEE Power Electron. Spec. Conf., 1996, pp. 1710-1716.

\* cited by examiner

CHARGING SYSTEM WITH ADAPTIVE POWER MANAGEMENT

CLAIM OF PRIORITY

This application claims the benefit of, and priority to, U.S. Provisional Patent Application Ser. No. 61/478,575, filed Apr. 25, 2011, U.S. Provisional Patent Application Ser. No. 61/604,226, filed Feb. 28, 2012, U.S. Provisional Patent Application Ser. No. 61/617,609 filed Mar. 29, 2012, and is a continuation-in-part of U.S. Non-Provisional patent application Ser. No. 13/421,836 filed Mar. 15, 2012 now abandoned, the disclosures of which are each incorporated herein in their entirety by reference.

DETAILED DESCRIPTION

Portable electronic devices, such as smart phones, tablet computers, and laptop computers, have batteries to power electronic circuitry within the device. In addition, such devices may be powered with a household alternating current (AC) power through the use of what is known as an AC adapter that plugs into the wall and converts the AC power signal into a direct current (DC) signal to supply the required power to the device. The electrical current provided by the AC adapter is used to charge the battery of the electronic device and to power the electronic circuitry of the device.

Typically, each electronic device uses a dedicated AC adapter specially designed for that device. For example, the electronic device may require 5 watts (W) of power such that a first AC adapter provides a 1 ampere (A) current at 5 five volts (V) to charge the battery of the electronic device within a specified amount of time. If such an electronic device is utilized with a second AC adapter that is rated, for example, at only 2.5 watts and is capable of providing only a maximum current of 0.5 A at 5V, then this may cause an overload condition and subsequent shutdown of the second AC adapter. As a result, each electronic device needs its own dedicated AC adapter designed just for that device.

In operation, the vast majority of the current output by the AC adapter is provided when the battery in the electronic device is being charged. For example, if the current output by the AC adapter is 1 A, then 0.05-0.10 A may be required to power the electronic circuitry in the electronic device and the remaining 0.90-0.950 A is utilized to charge the battery. This situation exists only when the battery is very low on charge; while the battery is fully charged or nearly fully charged, the actual current drawn from the AC adapter would typically be on order of that required to power the electronic circuitry in the electronic device, namely 0.05-0.10 A in the present example.

Ideally, an AC adapter, or other input power source such as a solar panel array, operates so that the maximum amount of energy available from the adapter is provided notwithstanding these variations in the load placed on the adapter by the electronic device. By maximizing the amount of power provided by the AC adapter, the charging time of the battery in the electronic device is minimized. This is true because operating the AC adapter to provide maximum power ensures a maximum amount of current is available to charge the battery.

Figure 1:
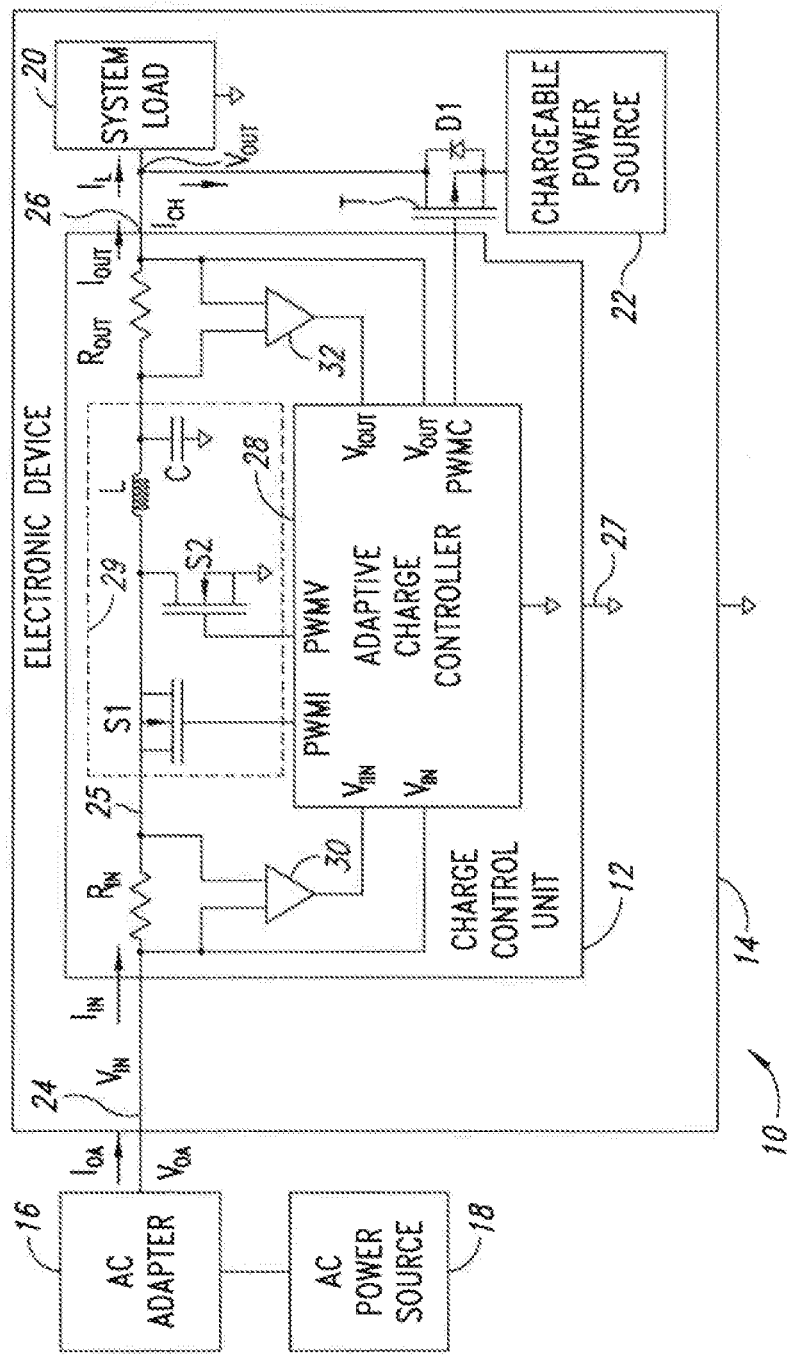
FIG. 1 is a functional block diagram of a charging system with adaptive power management according to one embodiment of the present invention.

Referring now to FIG. 1, a functional block diagram a charging system 10 with adaptive power management including maximum power point tracking according to one embodiment of the present invention is described. The charging system 10 includes a charge-control unit 12, which controllably supplies a DC voltage $V_{OUT}$ and current $I_{OUT}$ generated from an external power source, to one or both of a chargeable power source and an electronic system or device. The external power source is provided in the form of a conventional AC adapter 16, which converts alternating current (AC) and voltage supplied by an AC power source 18 to a direct current $I_{OA}$ and DC voltage $V_{OA}$. The DC voltage $V_{OA}$ and current $I_{OA}$ are "input" to the charge-control unit 12 and thus may be referred to as input voltage and current in the present description, and the corresponding power (i.e., $P_{OA}=V_{OA} \times I_{OA}$) as input power. Similarly, the DC voltage VOUT and current IOUT are supplied from or "output" from the charge-control unit 12 and thus may be referred to output current and voltage in the present description. An input node 24 of the charge-control unit 12 receives the DC voltage $V_{OA}$ and current $I_{OA}$ and the DC voltage $V_{OUT}$ and current $I_{OUT}$ are supplied on an output node 26 of the charge-control unit, as seen in FIG. 1. The AC power source 18 may be a conventional residential or commercial electrical service, a conventional generator, and the like.

In one embodiment, the charge-control unit 12 is implemented within, i.e., housed within, an electronic device 14, although in other embodiments the charge-control unit 12 may be separate from, i.e., housed separately from and/or remote from, the electronic device 14. The electronic device 14 is, for example, a portable electronic device such as a laptop or notebook computer, a tablet computer or other tablet device, a hand-held electronic device, a cellular or smart phone, and the like. In alternative embodiments, the electronic device 14 may be a non-portable electronic device. The electronic device 14 includes one or more electrical circuits and/or subsystems that consume electrical energy, and in FIG. 1 such electrical circuits or subsystems are represented as a single system load 20 Thus, the system load 20 corresponds to the electronic circuitry such as displays, touchscreens, wireless network (e.g., Wi-Fi) adapters, and so on where the electronic device 14 containing the system load is a smart phone, tablet computer, laptop computer, or other similar portable electronic device.

The electronic device 14 also includes a chargeable power source 22, which may be or include one or more conventional rechargeable batteries, one or more capacitors, and the like. In operation, the AC adapter 16 supplies the DC voltage $V_{OA}$ and current $I_{OA}$ to the charge-control unit 12 which, in turn, is operable to generate therefrom the DC voltage $V_{OUT}$, and the DC current $I_{OUT}$ applied to the system load 20 and to the chargeable power source 22, as necessary. An input node 24 of the charge control unit 12 receives the input voltage $V_{OA}$ and current $I_{OA}$, which are also designated input voltage $V_{IN}$ and input current $I_{IN}$ in FIG. 1. When the AC adapter 16 is uncoupled from the charge control unit 12, the chargeable power source 22 supplies via a diode D1, the DC voltage $V_{OUT}$ and any DC current $I_{OUT}$ required by the system load 20.

The charge-control unit 12 includes an adaptive charge controller 28 and a DC-to-DC converter 29. In the embodiment of FIG. 1, the DC-to-DC converter 29 is a Buck converter (i.e., has a Buck converter topology) and includes switches S1 and S2 in the form of power MOS transistors, an inductor L and a capacitor C. The adaptive charge controller 28 applies complementary pulse-width-modulated control signals PWMI and PWMV to the switches S1 and S2, respectively. The operation of the Buck DC-to-DC converter 29 is well understood by those skilled in the art and thus, for the sake of brevity and so as not to obfuscate the embodiments of the present invention being described herein, this operation will now be only briefly described. In operation, the adaptive charge controller 28 generates the complementary pulse-width-modulated control signals PWMI and PWMV to alternately turn the switches S1 and S2 ON and OFF to generate the desired output voltage $V_{OUT}$. The control signals PWMI and PWMV are complementary to thereby operate the switches S1 and S2 in a complementary manner, meaning that when control signal PWMI turns ON switch S1 then control signal PWMV turns OFF switch S2. Conversely, when control signal PWMI turns OFF switch S1 then control signal PWMV turns ON switch S2. The control signals PWMI and PWMV are pulse-width-modulated signals that control the converter 29 to generate the desired output voltage $V_{OUT}$ applied to the system load 20. When the switch S1 is turned ON energy is stored in the inductor L and supplied to the load 20. Conversely, when switch S1 is turned OFF and switch S2 turned ON the inductor L is coupled across the load through switch S2 and energy stored in the inductor is transferred to the load 20. The PWMI and PWMV signals have an associated period T and a duty cycle D of these signals determines the value of the output voltage $V_{OUT}$, where the duty cycle is defined as the duration the switch S1 is turned ON ($T_{ON}$) divided by the period T (D=$T_{ON}$/T), as will be appreciated by those skilled in the art.

The adaptive charge controller 28 senses a number of different signals and utilizes these sensed signals in controlling the duty cycle D of the generated control signals PWMI and PWMV to generate the desired output voltage $V_{OUT}$ and current $I_{OUT}$. The charge-control unit 12 further includes an input current sensor formed by an input current sense resistor $R_{IN}$ and differential amplifier 30 to sense the input current $I_{IN}$ of the charge control unit 12, and note as seen in FIG. 1 the input current $I_{IN}$ is also the output current $I_{OA}$ provided by the AC adapter 16. The output of the current-sense amplifier 30 is a voltage $V_{IIN}$ having a value proportional to the input current $I_{IN}$. The charge control unit 12 also senses the input voltage $V_{IN}$. In alternative embodiments, one or more other conventional current and/or voltage sensors may be used to determine the input current $I_{IN}$ and input voltage $V_{IN}$. The charge-control unit 12 further includes an output-current sensor formed by a resistor $R_{OUT}$ and a differential amplifier 32. The output of the amplifier 32 is a voltage $V_{IOUT}$ that is proportional to the output current $I_{OUT}$ supplied by the charge-control unit 12. In alternative embodiments, one or more other conventional current and/or voltage sensors may be used to determine the output current $I_{OUT}$ and voltage $V_{OUT}$ respectively of the charge-control unit 12. In any case, the charge-control unit 12 senses the input voltage and current $V_{IN}$, $I_{IN}$ and output voltage and current $V_{OUT}$, $I_{OUT}$.

In the embodiment of FIG. 1, the charge-control unit 12 also controls a power metal oxide semiconductor (MOS) transistor T to limit the flow of a charging current $I_{CH}$ to the chargeable power source 22 when this power source is nearly completely discharged. The charge-control unit 12 controls the transistor T in a linear mode when the voltage of the chargeable power source 22 is very low (i.e., when the chargeable power source is nearly completely discharged) so that the flow of the charging current $I_{CH}$ from the output node on which the output voltage $V_{OUT}$ is present does not cause this output voltage to decrease or "droop" too much. Once the voltage on the chargeable power source 22 increases to a level that is closer to the value of the output voltage $V_{OUT}$ (e.g., when the voltage on chargeable power source has increased to approximately 75% of its operating value) then the charge-control unit 12 turns the transistor T fully ON to allow for maximum charging current $I_{CH}$ to charge the chargeable power source 22.

Although in the embodiment of FIG. 1 the DC-to-DC converter 29 has a Buck converter topology, other topologies may be utilized in other embodiments. For example, the DC-to-DC converter has a Buck-Boost, Boost, or Cuk, or other suitable topology in alternative embodiments of the present invention. In these alternative embodiments, the adaptive charge controller 28 operates to generate the required control signals to control operation of the DC-to-DC converter 29, as will be appreciated by those skilled in the art.

Figure 2:
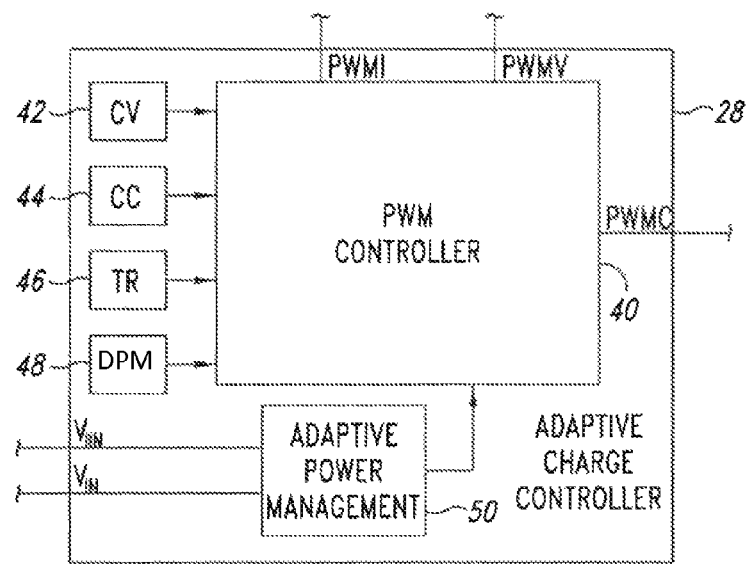
FIG. 2 is a more detailed functional block diagram of the adaptive charge controller of FIG. 1.

Referring now to FIG. 2, this figure is a more detailed functional block diagram of the adaptive charge controller 28 of FIG. 1. In the embodiment illustrated in FIG. 2, the adaptive charge controller 28 includes a pulse-width-modulation (PWM) controller 40, which receives control signals from a number of mode control modules 42-50 and produces the pulse-width-modulation control signals PWMI and PWMV to control the generated output current $I_{OUT}$ and output voltage $V_{OUT}$ supplied by the charge-control unit 12. The PWM controller 40 also produces the control signal PWMC to control the operation of the transistor T to thereby control the amount or portion of the output current $I_{OUT}$ that is provided as the charge current $I_{CH}$ to the chargeable power source 22 and, more specifically, to limit this charge current when the voltage on the chargeable power source is nearly completely discharged.

In the illustrated embodiment, the mode-control modules 42-50 include constant-voltage (CV) control module 42, constant-current (CC) control module 44, trickle-charge (TR) control module 46, dynamic-power-management (DPM) control module 48, and an adaptive-power-management (APM) control module 50. The adaptive charge controller 28 operates in a plurality of different modes each corresponding and controlled by a different one of the control modules 42-50. Operation of a DC-to-DC converter in each of the constant voltage CV, constant current CC, trickle TR, and static power management (SPM) modes is understood by those skilled in the art and thus, for the sake of brevity, will not be described in detail herein. Briefly, the CV control module 42 controls operation of the PWM controller 40 so that the control signals PWMI, PWMV cause the charge control unit 12 to produce the output current $I_{OUT}$ at a constant output voltage $V_{OUT}$. The CC control module 44 controls operation of the PWM controller 40 so that the controls signals PWMI, PWMV in a manner that causes the charge control unit 12 to produce a constant output current $I_{OUT}$. The trickle charge TR control module 46 controls operation of the PWM controller 44 to generate control signals PWMI, PWMV that causes the charge control unit 12 to charge the chargeable power source 22 at a slow, controlled charging rate (i.e., at a "trickle").

The dynamic power management (DPM) control module 48 controls the signals PWMI, PWMV in a manner that reduces "droop" of the output voltage $V_{OUT}$ during rapid transient events demanding more output current $I_{OUT}$. As will be appreciated by those skilled in the art, in the DPM mode of operation the chargeable power source 22 is connected to the output node 26 (FIG. 1) so long as the voltage across the chargeable power source is greater than a minimum threshold required to properly power the system load 20. In this way, the chargeable power source 22 supplies a portion of the output current $I_{OUT}$ and in the event some sort of transient condition in the system load 20 occurs that increases the demand of output current $I_{OUT}$ above that which can be supplied by the AC adapter 16 (i.e., greater than input current $I_{IN}$) then the chargeable power source 22 and AC adapter 16 operate in combination to supply the required output current. When the voltage across the chargeable power source 22 is less than the minimum threshold required to properly power the system load 20, the chargeable power source is isolated from the output node 26 (FIG. 1) and charged in a "trickle" mode via the TR control module 46.

The APM control module 50 controls the PWM controller 40 to produce control signals PWMI, PWMV when certain operating conditions of the input voltage $V_{IN}$ and input current $I_{IN}$ exist. More specifically, the APM module 50 controls the PWM controller 40 in the APM mode when the input voltage $V_{IN}$ drops below a voltage threshold or when the input current $I_{IN}$ exceeds a current threshold, as will be described in more detail below. Such a situation arises when, for example, the output current $I_{OUT}$ demanded by the combination of the system load 20 and the chargeable power source 22 exceeds the available input current $I_{IN}$ from the AC adapter 16 (i.e., where the demanded input current $I_{IN}$ exceeds the maximum output current $I_{OA}$ that can be supplied by the AC adapter 16). Such a drop in the input voltage $V_{IN}$ indicates the input current $I_{IN}$ has become so large that the input voltage has begun to "collapse," as will be appreciated by those skilled in the art.

Figure 3:
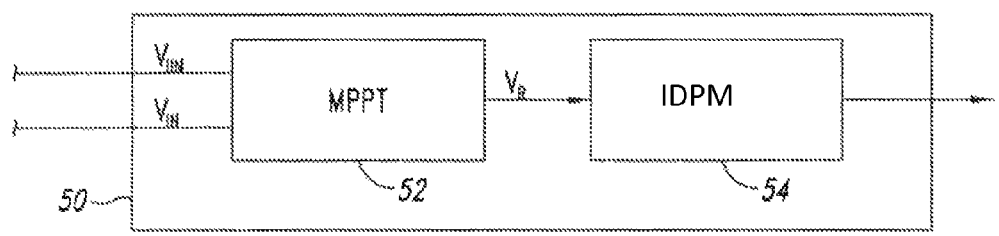
FIG. 3 is a more detailed functional block diagram of one embodiment of the adaptive power management (APM) control module of FIG. 2.

FIG. 3 is a more detailed functional block diagram showing one embodiment of the APM control module 50 of FIG. 2. In the illustrated embodiment, the APM control module 50 includes a maximum power point tracking (MPPT) module 52 receiving the input voltage $V_{IN}$ (FIG. 1) and input current signal $V_{IIN}$ (FIG. 1). The MPPT module 52 is operable, as will be described in greater detail hereinafter, to generate a reference control signal $V_R$ responsive to the input voltage $V_{IN}$ and current $I_{IN}$. An input dynamic power management (IDPM) control module 54 is operable in a conventional manner responsive to the reference control signal $V_R$ and to one or more of the output current signal $V_{IOUT}$ and the output voltage $V_{OUT}$ to control the PWM controller 40 (FIG. 2) to generate the control signals PWMI, PWMV and PWMC in a manner that prioritizes output current $I_{OUT}$ to the system load 20 and provides the remaining output current $I_{OUT}$ as the charge current $I_{CH}$ to charge the chargeable power source 22. As will be appreciated by those skilled in the art, the IDPM control module 54 is also operable responsive to the input voltage $V_{IN}$ dropping below a threshold $V_{IN\_DPM}$ to reduce the input current $I_{IN}$ to thereby prevent the input voltage from decreasing even further.

Figure 4:
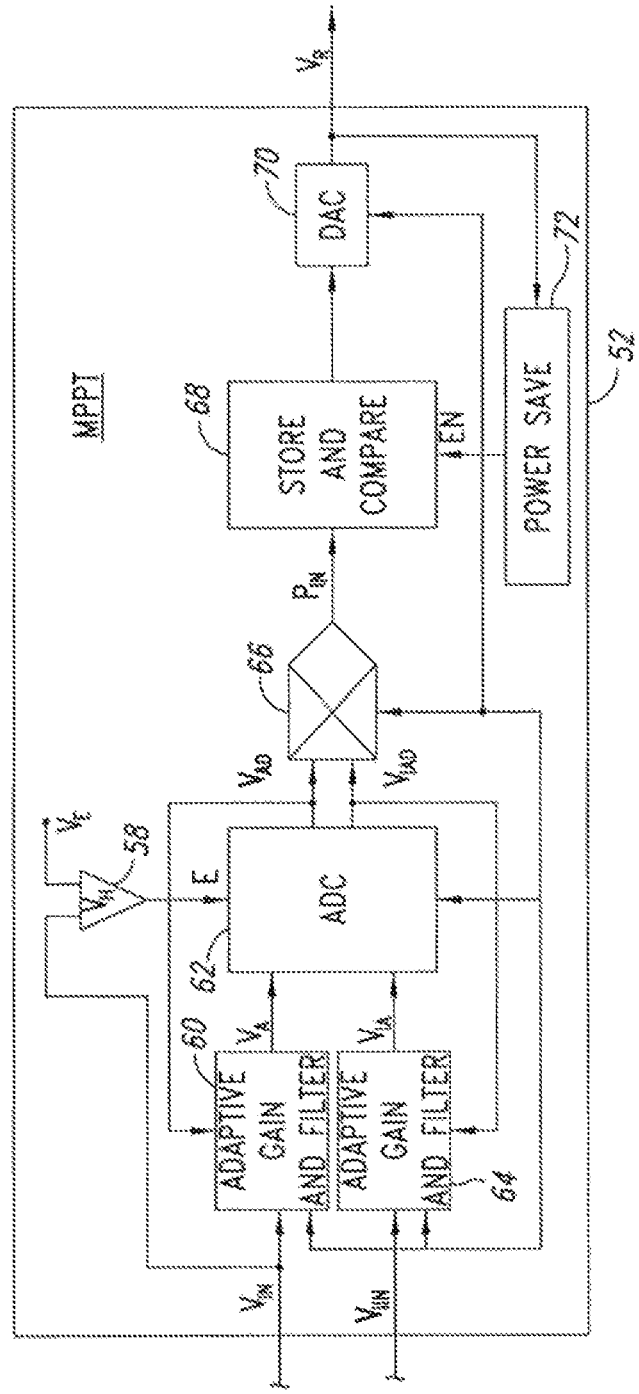
FIG. 4 is a more detailed functional block diagram of the maximum power point tracking (MPPT) module of FIG. 3 according to one embodiment of the present invention.

FIG. 4 is a block-diagram of one embodiment of the MPPT module 52 of FIG. 3. In the illustrated embodiment, the MMPT module 52 includes a comparator 58 having one input receiving the input voltage $V_{IN}$ and another input receiving an input threshold $V_E$. The input threshold $V_E$ corresponds to the output voltage $V_{OA}$ of the AC adapter 16 (FIG. 1), which as previously discussed is the input voltage $V_{IN}$ of the charge control unit 12 of FIG. 1. Thus, the comparator 58 determines whether the input voltage $V_{IN}$ has dropped below the input threshold $V_E$, which as was also discussed above the IDPM control module 54 (FIG. 3) is activated when the output voltage $V_{OA}$ (i.e., input voltage $V_{IN}$) of the AC adapter 16 drops below the input threshold $V_E$.

The comparator 58 is illustratively designed to have some amount of hysteresis such that the comparator 58 produces an active enable signal E when the input voltage $V_{IN}$ (i.e., output voltage $V_{OA}$ from the AC adapter 16) drops below input threshold $V_E$. Conversely, the comparator 58 produces an inactive enable signal E when the input voltage $V_{IN}$ increases to a voltage greater than the sum of the input threshold $V_E$ and a hysteresis voltage $V_H$ ($V_{IN} > V_E + V_{H1}$). Alternatively, the comparator 58 may be configured to produce an active enable signal E when the input current signal $V_{IIN}$ indicating the value of the input current $I_{IN}$ increases above the input threshold $V_E$ and drive enable signal E inactive when the input current signal $V_{IIN}$ decreases to a voltage less than the difference of $V_E$ and the hysteresis voltage $V_H$. In this situation the input threshold $V_E$ and hysteresis voltage $V_H$ relate to current threshold values related to the current $I_{OA}/I_{IN}$ from the AC adapter 16, while in the former situation these both relate to voltage threshold values related to the output voltage $V_{OA}$ of the AC adapter.

The MPPT module 52 further includes an adaptive gain and filter circuit 60 which receives at one input the input voltage $V_{IN}$ (i.e., corresponding to the output voltage of the AC adapter 16) and which produces as an output an adjusted voltage $V_A$. The adjusted voltage $V_A$ is provided to one input of a conventional analog-to-digital converter (ADC) circuit 62. Another adaptive gain and filter circuit 64 receives at one input the input current signal $V_{IIN}$ (i.e., a voltage signal having a value which corresponds to the output current $I_{OA}$ of the AC adapter 16) and produces as an output an adjusted current signal $V_{IA}$ which is illustratively a voltage signal having a value corresponding to the output current of the AC adapter 16 as adjusted by the adaptive gain and filter circuit 62. The adjusted current signal $V_{IA}$ is provided to another input of the ADC circuit 62. The ADC circuit 62 is operable in a conventional manner to convert the adjusted analog signals $V_A$ and $V_{IA}$ to corresponding digital signals $V_{AD}$ and $V_{IAD}$ provided on separate respective outputs of the ADC circuit 62. The $V_{AD}$ output of the ADC circuit 62 is then provided to one input of a conventional digital multiplier circuit 66 and also to another input of the adaptive gain and filter circuit 60. The $V_{IAD}$ output of the ADC circuit 62 is provided to another input of the digital multiplier circuit 66 and also to another input of the adaptive gain and filter circuit 64. In one illustrative embodiment, the ADC circuit 62 is a 10-bit analog-to-digital converter such that the full count range is 1024 (e.g., $2^{10}$), although the ADC circuit may alternatively have more or fewer bits of resolution.

The ADC circuit 62 receives the enable signal E generated by the comparator 58, and the ADC circuit 62 is therefore operable to convert analog signals $V_A$, $V_{IA}$ to digital signals only when the enable signal E is activated (e.g., when the value of the input voltage $V_{IN}$ is sufficiently less than the value of threshold $V_E$ or input current $I_{IN}$ is sufficiently greater than the value of threshold $V_E$). Conversely, when the enable signal E is deactivated (e.g., when the value of input voltage $V_{IN}$ is sufficiently greater than the value of $V_E$ or when the value of input current $I_{IN}$ is sufficiently less than the value of $V_E$) the ADC circuit 62 is disabled and therefore not operable to convert the analog signals $V_A$, $V_{IA}$. Under such conditions, the output of the APM control module 50 (FIG. 3) does not affect operation of the adaptive charge controller 28 (FIG. 1) as the adaptive charge controller is in this situation operating in a mode controlled by one of the other control modules 42-48 (FIG. 2). The outputs of the ADC circuit 62 under such conditions may therefore be set to a default value that causes the output $V_R$ from the MPPT module 52 to have no affect on the operation of the IDPM unit 54 and/or that causes the output of the IDPM unit 54 to have no affect on the operation of the adaptive charge controller 28.

The filter portion of each adaptive gain and filter circuit 60, 64 is illustratively provided to remove noise that may be present on the analog input signals $V_{IN}$ and $V_{IIN}$. In this regard, each adaptive gain and filter circuit 60, 64 is a conventional low-pass filter in one embodiment of the MPPT module 52. The adaptive gain and filter circuits 60, 64 may be other known types of signal filtering circuits in other embodiments. The filtered analog signals $V_{IN}$, $V_{IIN}$ may be referred to herein as $F(V_{IN})$ and $F(V_{IIN})$, respectively, and correspond to the filtered analog signals prior to gain being applied to these signals by the circuits 60, 64.

The adaptive gain portion of each adaptive gain and filter circuit 60, 64 is illustratively configured to apply (e.g., as a multiplier) an adaptively determined gain to the filtered analog input signals $F(V_{IN})$ and $F(V_{IIN})$ such that each resulting adjusted analog signal $V_A$, $V_{IA}$ has a value that falls within a window defined by low and high values, with such low and high values defining the window being themselves variable or adaptive in some embodiments and predefined in other embodiments. In the following description, the low and high values defining the window are assumed to be predefined. For purposes of illustrating operation of the adaptive gain and filter circuits 60, 64, the gain applied by the adaptive gain and filter circuit 60 to the filtered analog signal $F(V_{IN})$ will be designated herein as $G_{60}$ and the gain applied by the adaptive gain and filter circuit 64 to the filtered analog signal $F(V_{IIN})$ will be designated herein as $G_{64}$. Thus, in accordance with these designations, $V_A = G_{60}*F(V_{IN})$ and $V_{IA} = G_{64}*F(V_{IIN})$. In the following description when referring generally to the gain of one or both of the adaptive gain and filter circuits 60, 64 the gain will be designated as G.

Each of the adaptive gain and filter circuits 60, 64 is illustratively designed to compare the respective output of the ADC circuit 62 with the predefined low and high values, and to lower the value of its gain G if the value of the respective output of the ADC circuit 62 is greater than the predefined high value and to raise the value of its gain if the value of the respective output of the ADC circuit 62 is less than the predefined low value. It will be understood that one or both of the low and high values used for the adaptive gain and filter circuit 60 may or may not be the same as those used for the adaptive gain and filter circuit 64, and in various embodiments such low and high values may be selected and varied in various different ways. It will further be understood that the circuits 60, 64 may be configured to raise and lower its respective gain G value by the same or different amount, and that within each circuit the amount by which the gain is raised may or may not be the same as the amount by which the gain is lowered. The amount by which either or both of the circuits 60, 64 raises and/or lowers its respective gain G may vary between applications for different embodiments of the MPPT module 52.

In one illustrative example of the adaptive gain portions of the adaptive gain and filter circuits 60, 64, the predefined low value for each circuit 60, 64 is 25% of the full range of the ADC circuit 62 (i.e., the maximum count value of the ADC circuit 62) and the predefined high value for each circuit 60, 64 is 75% of the full range of the ADC circuit 62, and the amount by which each gain value $G_{60}$ and $G_{64}$ is raised or lowered is ½ of the current gain value. Using as an example a 10-bit ADC circuit 62, the full range of such an ADC circuit 62 is 1024. The predefined low value is therefore (0.25*1024)=256, and the predefined high value is (0.75*1024)=768. In this example implementation of the adaptive gain and filter circuits 60, 64, each circuit 60, 64 thus operates identically by comparing the count value of voltages $V_{AD}$ and $V_{IAD}$ respectively to 256 and 768. If the count value of $V_{AD}$ is less than 256, the gain value $G_{60}$ is doubled (e.g., new $G_{60}=2*G_{60}$), and if the count value of $V_{IAD}$ is less than 256 the gain value $G_{64}$ is likewise doubled (e.g., new $G_{64}=2*G_{64}$). If the count value of $V_{AD}$ is instead greater than 768, the gain value $G_{60}$ is halved (e.g., new $G_{60}=G_{60}/2$), and if the count value of $V_{IAD}$ is greater than 768 the gain value $G_{64}$ is likewise halved (e.g., new $G_{64}=G_{64}/2$). If instead either count value $V_{AD}$ or $V_{IAD}$ is between 256 and 768, the corresponding gain value $G_{60}$ or $G_{64}$ respectively is not changed. This process continues until both $V_{AD}$ and $V_{IAD}$ are between the predefined low and high values, e.g., 256 and 768, respectively. It will be understood that this particular implementation is provided only by way of example, and should not be considered to be limiting. The adaptive gain provided by the adaptive gain and filter circuits 60, 64 improves the resolution and dynamic range of the MPPT module 52 under varied operating conditions, such as where the input voltage VIN and/or input current IIN have very small values.

The digital multiplier circuit 66 is operable to multiply the digital signals $V_{AD}$ and $V_{IAD}$ from the ADC circuit 62 to thereby produce an input power $P_{IN}=V_{AD}*V_{IAD}$ which represents the electrical power received by the charge control unit 12 of FIG. 1 (i.e., the electrical power provided by the AC adapter 16 of FIG. 1). The input power $P_{IN}$ is provided to a store and compare circuit 68 that includes one or more memory registers (not shown in FIG. 4) which store therein the most recent value of the input power $P_{IN}$. The store and compare circuit 68 is further operable to compare the current value of the input power $P_{IN}$ with a previously stored value of input power $P_{IN}$. The store and compare circuit 68 also determines a step value based on the difference between the current and stored values of input power $P_{IN}$ and a direction value of the input power based on whether the current value of $P_{IN}$ is greater or less than the stored value of $P_{IN}$. The step value determination may or may not be weighted, and may be a simple arithmetic difference or include a more complex difference determination. The store and compare circuit 68 utilizes the step and direction values to generate an output that is provided to a conventional digital-to-analog converter (DAC) circuit 70, which converts the digital output to a current value of the reference control signal $V_R$.

The IDPM circuit 54 of FIG. 3 is operable responsive to the reference control signal $V_R$ from the DAC 70 to apply control signals to the PWM controller 40 (FIG. 2) which, in turn, controls the duty cycle of the control signals PWMI, PWMV, as previously described. Under conditions in which the electrical power demanded by the system load 20, or the combination of the system load 20 and the chargeable power source 22, is greater than that which can be produced by the AC adapter 16, the APM control module operates in this way to control one or the other of input voltage $V_{IN}$ and input current $I_{IN}$ such that the input power supplied to the charge control unit 12 (FIG. 1) from the AC adapter 16 has a maximum value, as will be explained in more detail below.

The store and compare circuit 68 in the MPPT module 52 of FIG. 4 determines the step value in accordance with one or more conventional input power maximization algorithms in one embodiment of the present invention. In one embodiment, the store and compare circuit 68 is configured to determine the step value using a conventional maximum power point tracking (MPPT) algorithm designed to adjust the reference control signal $V_R$ to a value that maximizes the input power $P_{IN}$ supplied by the AC adapter 16. For example, the MPPT module 52 may implement an MPPT algorithm in the form of a conventional perturb-and-observe algorithm. With this approach, the MPPT module 52 adjusts the value of the reference control signal $V_R$ to a new value from its current value and then determines whether this new reference control signal value results in the input power $P_{IN}$ increasing or decreasing. If the input power PIN increased, then the MPPT module 52 again adjusts the VR signal in same direction (e.g., again increases the value of the VR signal by the step value). The MPPT module 52 then again determines whether this new reference control signal value results in the input power $P_{IN}$ increasing or decreasing. As long as the input power PIN is increasing, the MPPT module 52 continues incrementally adjusting the VR signal this way. When the MPPT module 52 determines a new value for the reference control signal VR results in the current input power $P_{IN}$ decreasing from its prior value, the MPPT module then increments the VR signal in the opposite direction. For example, if sequentially increasing the value of the VR signal by step value results in successively higher input power PIN values then the MPPT module 52 continues doing so until the input power decreases, at which point the MPPT module decreases the VR signal by the step value.

Figure 7A:
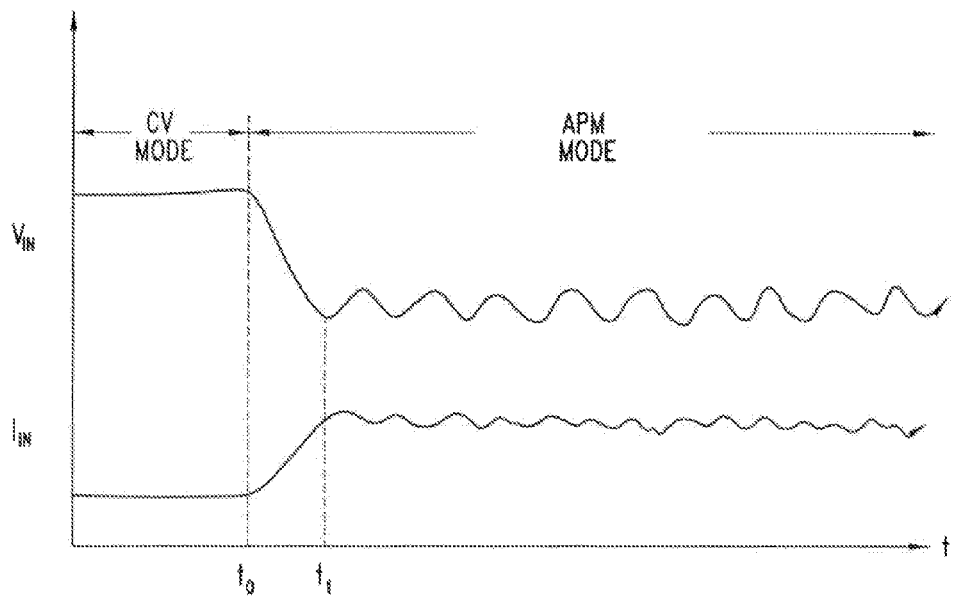
FIGS. 7A and 7B are timing diagrams showing the input voltage and input current generated during the control process of FIG. 6.
Figure 7B:
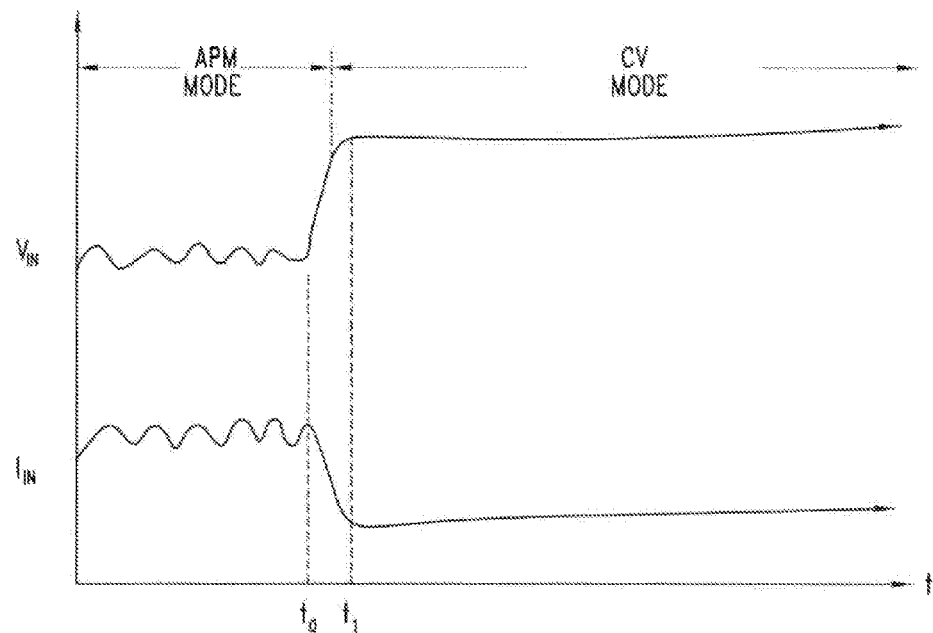

At this point, the APM module 50 containing the MPPT module 52 is controlling the charging system 10 (FIG. 1) so that the charging system is operating at, or more precisely, very near, maximum power of the AC adapter 16, as will be explained in more detail with reference to FIGS. 7A and 7B. Referring briefly to FIGS. 7A and 7B, as is seen in these graphs in the APM mode of operation as just described, the values for the input voltage VIN and input current IIN vary or "dither" slightly around some intermediate value that corresponds to the true values for VIN and IIN that result in maximum power from the AC adapter 16. This is true because as just described the MPPT module 52 adjusts the VR signal using the step value and this finite step value results in this varying or dithering of the input voltage VIN and current IIN, and thus dithering of the input power PIN, around the true maximum power of the AC adapter 16.

The MPPT module 52 eventually reaches a point where a given step value change results in the input power PIN decreasing, and the MPPT module then changes the direction of the step value added adjust the VR signal. For example, assume sequentially incrementing the VR signal by the step value results sequentially increasing value for input power PIN. At some point, the new incremented VR signal will result in the input power PIN decreasing. The MPPT module 52 then changes the direction of adjustment of the VR signal, and thus decrements the VR signal by the step value. This will result in the input power PIN increasing so the MPPT module 52 will once again decrement the VR signal. This time the input power PIN will decrease so the MPPT module 52 will again change the direction of the adjustment of the VR signal and increment the VR signal by the step value. The MPPT module 52 continues operating in this manner to control the charging system 10 such that the input power PIN supplied by the AC adapter 16 varies or dithers about the true maximum value. To reduce the amount of this dither the MPPT module 52 could reduce magnitude of the step value when such a dithering condition is detected and thereby control the charging system 10 closer to the true maximum power PIN of the AC adapter 16.

Other embodiments of the MPPT module 52 utilize different MPPT algorithms such as a conventional incremental conductance method, a constant voltage method, or the like. In still other embodiments, the store and compare circuit 68 in the MPPT module 52 may alternatively be operable to determine the step value in accordance with other conventional maximum value determining techniques, examples of which may include, but are not limited to, one or more numerical hunting techniques, one or more conventional iterative techniques, or the like.

The MPPT module 52 further includes a power save circuit 72 which receives the reference control voltage $V_R$ and which is operable to produce an enable signal EN that is applied to the components 60-70. The EN signal places these components 60-70 and thus the MPPT module 52 in a low power or standby mode of operation, as will be described in more detail below.

Figure 5:
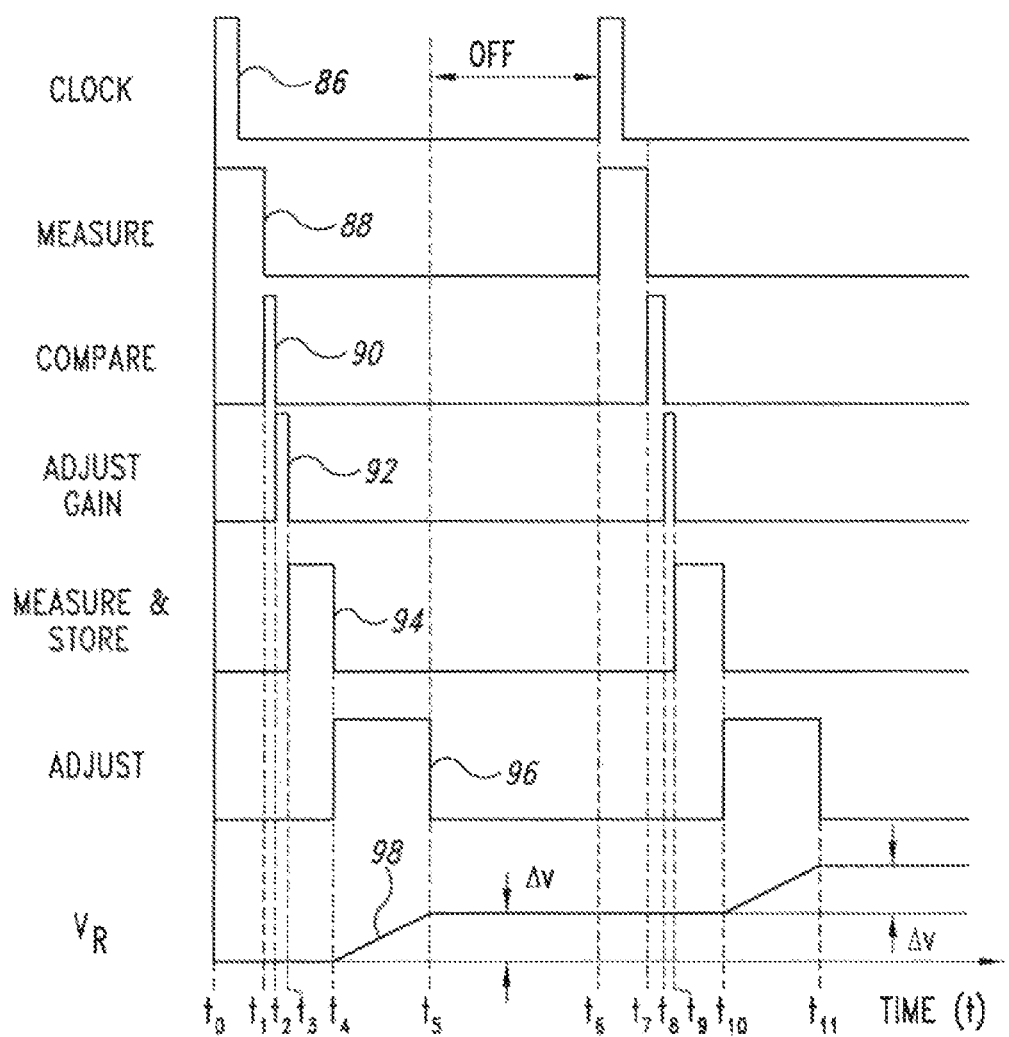
FIG. 5 is a timing diagram illustrating the operation of the MPPT module of FIG. 4 according to one embodiment of the present invention.

FIG. 5 is a timing diagram illustrating operation of the MPPT module 52 of FIG. 4 according to one embodiment. It will be understood that the timing diagram of FIG. 5 illustrates the reference control signal $V_R$ generated by the MPPT module 52 and that the remaining timing waveforms illustrated in the figure represent events carried out in the MPPT module during operation. FIG. 5 is arranged in this manner to show the timing of the events carried out by the MPPT module 52 relative to resulting changes in value of the reference control signal $V_R$ for the purpose of illustrating a power-saving feature implemented in the adaptive charge controller 28. In this regard, low-to-high (or high-to-low) transitions in a CLOCK timing waveform 86 represent beginnings of each complete set of events carried out by the MPPT module 52. A complete set of events carried out by the MPPT module 52 is illustrated in FIG. 5 by a combination of the $V_R$ signal 98 and a number of event waveforms, including a MEASURE waveform 88, a COMPARE waveform 90, an ADJUST GAIN waveform 92, a MEASURE & STORE waveform 94 and an ADJUST waveform 96, with time t being represented along the horizontal axis.

A first complete set of events begins, for example, at time $t_0$ where CLOCK 86 and MEASURE 88 both transition from low-to-high, which signals the measurement, e.g. by the adaptive gain and filter circuits 60 and 64, of the input voltage and current $V_{IN}$ and $V_{IIN}$, respectively. Over the duration of MEASURE 88, $V_{IN}$ and $V_{IIN}$ are passed through the adaptive gain and filter circuits 60, 64 such that $V_{IN}$ and $V_{IIN}$ are each filtered and then multiplied by corresponding gain values (e.g., with $G_{60}$ and $G_{64}$ both set to 1 for the first pass), the ADC circuit 62 converts the resulting $V_A$ to $V_{AD}$ and $V_{IA}$ to $V_{IAD}$, and the digital multiplier 66 then computes $P_{IN}$, all as described hereinabove. At time $t_1$, MEASURE 88 transitions from high-to-low and COMPARE 90 transitions from low-to-high, during which the store and compare circuit 68 compares $P_{IN}$ to the previous value of $P_{IN}$ stored in the one or more memory registers of the store and compare circuit 68 to determine the step value and direction of change of $V_R$ as described above. For the first set of events, the stored value of $P_{IN}$ may be, for example, but not limited to, a previously stored $P_{IN}$ value, a default power value or the current value of $P_{IN}$. Thereafter at time $t_2$, COMPARE 90 transitions from high-to-low and ADJUST GAIN 92 transitions from low-to-high, during which the adaptive gain and filter circuits 60 and 64 adjust the gain value(s) $G_{60}$ and/or $G_{64}$ if required as described above. Thereafter at time $t_3$, ADJUST GAIN 92 transitions from high-to-low and MEASURE & STORE transitions from low-to-high, during which the adaptive gain and filter circuits 60 and 64 measure the input voltage and current, $V_{IN}$ and $V_{IIN}$ respectively, $V_{IN}$ and $V_{IIN}$ are passed through the adaptive gain and filter circuits 60, 64 such that $V_{IN}$ and $V_{IIN}$ are each filtered and then multiplied by corresponding (and possibly adjusted) gain values $G_{60}$ and $G_{64}$ respectively, the ADC circuit 62 then converts the resulting $V_A$ to $V_{AD}$ and $V_{IA}$ to $V_{IAD}$, the digital multiplier 66 then computes $P_{IN}$, and the store and compare circuit 68 then compares the current $P_{IN}$ to the previous value of $P_{IN}$ stored in the one or more memory registers of the store and compare circuit 68 to determine the step value and direction of change of $V_R$. Thereafter at time $t_4$, MEASURE & STORE 94 transitions from high-to-low and ADJUST 96 transitions from low-to-high, during which the DAC circuit 70 converts the step value and direction to an analog signal, e.g., a voltage signal in this example, and adds this voltage signal to the current value of $V_R$, which then causes $V_R$ 98 to change in response. In the example illustrated in FIG. 5, $V_R$ 98 changes by increasing in value, e.g., by an amount $\Delta V$, during the time duration $t_4$ to $t_5$. At time $t_5$, $V_R$ 98 has been adjusted (i.e. increased by $\Delta V$) and ADJUST 96 thus transitions from high-to-low. As previously mentioned, to reduce the amount of dither the MPPT module 52 could reduce the magnitude of the step value at certain points during operation, where the previously discussed "step value" corresponds to $\Delta V$ in FIG. 5.

The time $t_5$ ends the first complete set of events carried out by the MPPT module 52. Referring again to FIG. 4, the MPPT module 52 further includes a power save circuit 72 which illustratively receives as an input the reference control voltage $V_R$, and which produces as an output an enable signal EN. The enable signal EN is provided to an enable input of each of the adaptive gain circuits 60, 64, the ADC 62, the multiplier circuit 66, the store and compare circuit 68 and the DAC 80. Illustratively, the power save circuit 72 monitors the reference control voltage $V_R$, and during $t_1$-$t_4$, i.e., when $V_R$ is not being adjusted, the enable signal EN is set to an operating enable value, e.g., logic high or logic low, such that the circuits 60, 62, 64, 66, 68 and 70 of the MPPT module 52 are fully operational. When $V_R$ reaches a constant or otherwise stable voltage level, e.g., $\Delta V$ illustrated in FIG. 5, after being modified during the ADJUST time period, e.g., between $t_4$ and $t_5$, the power save circuit 72 changes the value of EN, e.g., to logic low or logic high, to set EN to a circuit disable value.

In the embodiment of the MPPT module 52 illustrated in FIG. 4, the circuits 60, 62, 64, 66, 68 and 70 are responsive to the circuit disable value of EN to enter a stand-by mode. This occurs at the time $t_5$ in FIG. 5 and is represented by the designation OFF at the top of the figure between the times $t_5$ and $t_6$. Illustratively, the stand-by mode for the circuits 60, 62, 64 and 66 is a shut down mode in which these circuits 60, 62, 64 and 66 completely power down such that they do not consume any current. The shut down mode of the circuits 68 and 70 is illustratively a sleep mode in which they consume only enough current to maintain valid, i.e., stored and current, data. Thus, in response to a detected constant or otherwise stable value of $V_R$, the power save circuit 72 disables the MPPT module 52, e.g., by turning off or disabling electrical power to some or all of the remaining circuits of the MPPT module 52 during the time interval $t_5$ to $t_6$ to thereby conserve power during this time interval. After a waiting time period (i.e., between $t_5$ and $t_6$ in FIG. 5), the power save circuit 72 again changes the value of EN, e.g., to logic high or logic low, to reset the EN signal to the circuit enable value at the time $t_6$. The time $t_6$ begins a new complete set of events carried out by the MPPT module 52, and the events described between $t_0$-$t_6$ begin again and are carried out as just described between $t_6$ and $t_{11}$, and repeat thereafter as long as the MPPT module 52 is activated. Of course at some point when a given change in the reference control signal VR by the step value $\Delta V$ results in the input power PIN decreasing, the value of the reference control signal will subsequently be reduced and not increased by the step value $\Delta V$, as previously discussed.

Operation in this way, namely placing the components 60-70 in a stand-by mode, results in a reduced power consumption for the electronic device 14 (FIG. 1) containing the adaptive charge controller 28 (FIG. 1), which contains the MPPT module 52. Such operation can result in meaningful power savings for the electronic device 14, which is particularly important when the device is a portable device such as a smart phone or tablet computer. Moreover, although the scale in FIG. 5 may not expressly show this fact, one skilled in the art will realize that the OFF time period from time t5 to t6 is typically much greater than the calculation and adjustment time period from time t0 to t5 during which the previously described operations are performed and the value of the reference control signal VR adjusted by the step value $\Delta V$. For example, the OFF time period may be on the order of 100 ms while the calculation and adjustment time period (t0-t5) is on the order of 1 ms. Thus, if operation of the MPPT module 52 in the active and stand-by modes is viewed in terms of a "duty cycle," the duty cycle is only about 1% (i.e., 1 ms/100 ms×100%).

Figure 6:
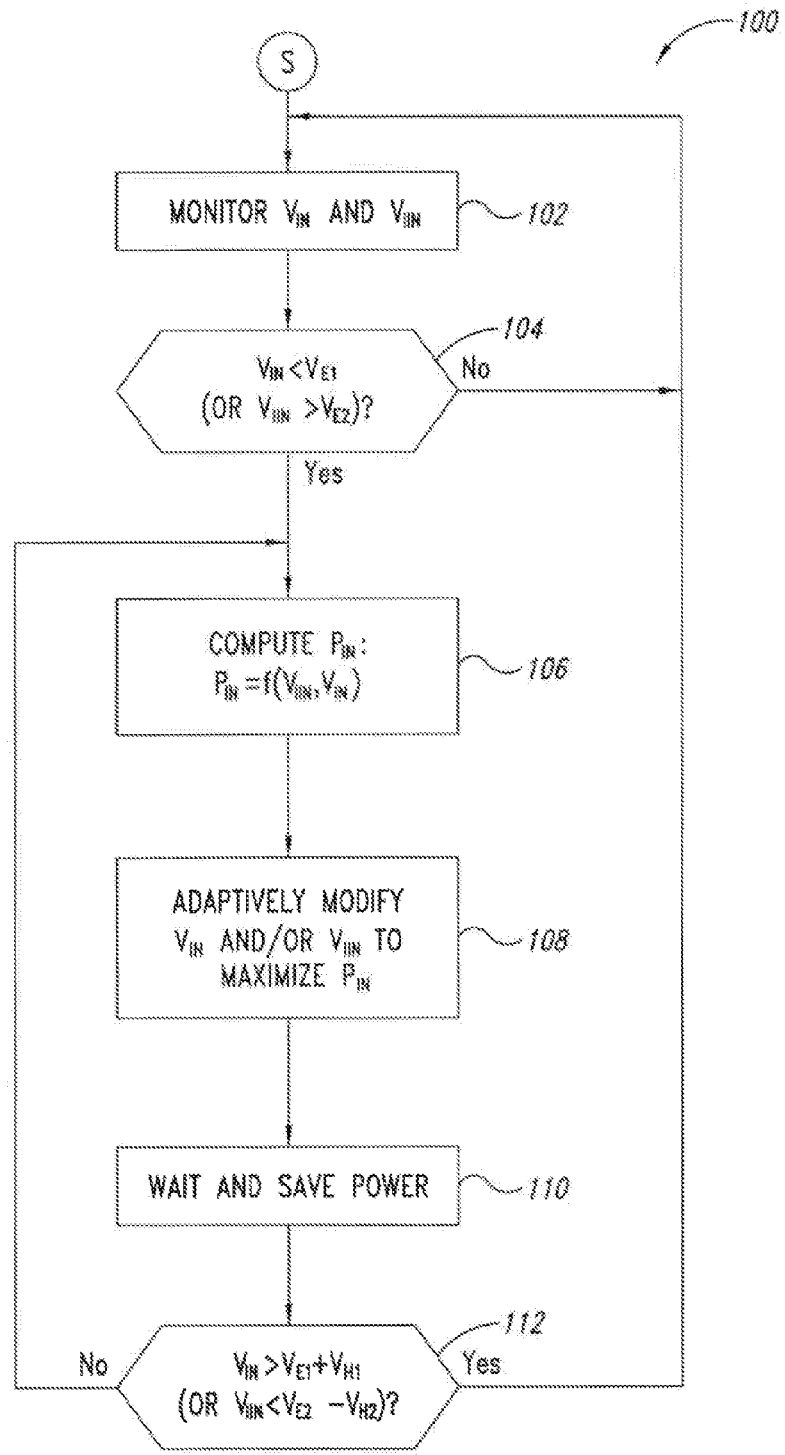
FIG. 6 is a flowchart of a control process executed by the APM control module of FIG. 3 and the PWM controller of FIG. 2 for maximizing the output power provided by the AC adapter of FIG. 1 according to one embodiment of the present invention.

FIG. 6 a flowchart is shown of one illustrative process 100 executed by the MPPT module 52 and the IDPM unit 54 in the APM module and PWM controller 40 of FIG. 2 for maximizing power produced by the AC adapter 16 under the operating conditions as described above, namely where the input current $I_{IN}$ demanded by the combination of the system load 20 and the chargeable power source 22 exceeds that which can be provided by the AC adapter 16. In one illustrative embodiment, the MPPT module 52 is implemented in the form of purely analog circuitry, and in such an embodiment the process 100 illustrated in FIG. 6 represents an algorithm executed by such analog circuitry. In embodiments which may include one or more conventional processor circuits, e.g., one or more microprocessors, signal processors or the like, the process 100 may be implemented, at least in part, in the form of one or more software algorithms stored in a memory and executable by the processor circuit to carry out, at least in part, the process 100.

The process 100 will, for purposes of description, be described as being implemented and executed by the MPT module 52, the IDPM unit 54 and the PWM controller 40 of FIG. 2. The process 100 begins at step 102 where the MPPT module 52 monitors the input voltage $V_{IN}$ and the input current via signal $V_{IIN}$, corresponding to the output voltage, $V_{OA}$, and the output current $I_{OA}$ produced by the AC adapter 16 (IOA=IIN). Thereafter at step 104, the MPPT module MPPT module 52 determines whether input voltage $V_{IN}$ is less than the input threshold $V_{E1}$, or in the alternative whether $V_{IIN}$ is greater than another predefined voltage value, $V_{E2}$. Input threshold VE discussed above used in the context of the description of this process as being either a threshold of the input voltage VIN or voltage VOA from AC adapter 16, and is designated VE1 in this situation. Alternatively, Input threshold VE is a threshold of the input current IIN or current IOA from AC adapter 16, and is designated VE2 in this situation. Input threshold $V_{E1}$ is a value or magnitude of the output voltage $V_{OA}$ produced by the AC adapter 16 which is sufficiently below the relatively constant magnitude of output voltage $V_{OA}$ produced by the AC adapter 16 when the output current is less than a rated current of the adapter, as will be appreciated by those skilled in the art. The current IOA (i.e., input current IIN) demanded by the system load 20 and the chargeable power source 22 is greater than that which can be produced by the AC adapter 16. In one example embodiment in which the relatively constant value of $V_{OA}$ is typically 5.0 volts, $V_{E1}$ may be, for example, set to 4.75 volts, although other values of $V_{E1}$ are contemplated by this disclosure.

In embodiments in which the reference control signal is $V_{IR}$, $V_{E2}$ illustratively corresponds to a value or magnitude of the output current, $I_{OA}$, produced by the AC adapter 16 which is sufficiently above the rated current to indicate that the magnitude of the output current, $I_{OA}$, demanded by the combination of the charge control unit 12 and the system load 20 or by the combination of the charge control unit 12, the system load 20 and the chargeable power source 22 is greater than that which can be produced by the AC adapter 16. In either case, the "NO" branch of step 104 returns the process to step 102, and the "YES" branch of step 104 advances to step 106 where the MPPT module 52 is operable to compute the input power, $P_{IN}$, as a well-known function of $V_{IIN}$ and $V_{IN}$, e.g., $P_{IN}=K*V_{IIN}*V_{IN}$, where K is a constant set to a value which translates $V_{IIN}$ to the actual value of $I_{IN}$. The input power, $P_{IN}$, is of course the output power produced by the AC adapter 16, and step 106 advances to step 108 where the MPPT module 52, the IDPM unit 54 and the PWM controller 40 are together operable to adaptively modify $V_{IN}$ and/or $V_{IIN}$ as discussed hereinabove with respect to FIGS. 3-5 to maximize $P_{IN}$. Thereafter at step 110, the MPPT module 52 is operable to wait for a time period and, during this waiting period, to conserve power consumed by the MPPT module 52 by shutting down all or most of the circuitry internal to the MPPT module 52, as previously discussed with reference to FIG. 5. Thus, during the waiting time period of step 110, which corresponds to the OFF time period in the embodiment of the MPPT module 52 discussed with reference to FIG. 5, little or no electrical power is consumed by the MPPT module 52, thereby conserving electrical power when operation of the MPPT module is not needed. Thereafter at step 112, the MPPT module 52 is operable to compare $V_{IN}$ to $V_{E1}+V_{H1}$, or to compare $V_{IIN}$ to $V_{E2}-V_{H2}$, where $V_{H1}$ and $V_{H2}$ represent predefined hysteresis voltage values. Thus, if $V_{IN}$ has not increased by at least $V_{H1}$ above $V_{E1}$ (or if $V_{IIN}$ has not decreased by at least $V_{H2}$ below $V_{E2}$), the process 100 loops back to step 106. Otherwise, the process loops back to step 102 to restart the process 100. It will be understood that, regardless of whether the reference control signal is $V_R$ or $V_{R}$, either or both of $V_{IN}$ and $V_{IIN}$ may be evaluated to determine whether the process 100 should advance from step 104 to step 106, i.e., to activate the MPPT module 52, and/or to determine whether the process 100 should exit from steps 106 and 108, i.e., whether to deactivate or otherwise discontinue operation of the MPPT module 52.

In any case, the Input Dynamic Power Management (IDPM) unit 54 is responsive in a conventional manner to the reference control signal VR to produce control signals from which the PWM controller 40 controls the duty cycle of the control signal PWMI or PWMV in a manner that controls the switches S1 or S2 respectively to draw from the AC adapter 16 input current $I_{IN}$ (corresponding to the output current, $I_{OA}$, of the AC adapter 16) and input voltage $V_{IN}$ (corresponding to the output voltage $V_{OA}$ of the AC adapter 16) that corresponds to the maximum available output power that can be produced by the AC adapter 16. By so controlling the switching circuitry of the charge control unit 12, the maximum output power that can be produced by the AC adapter 16 is supplied to the system load 20 and chargeable power source 22.

As previously mentioned, FIGS. 7A and 7B are timing diagrams showing the input voltage VIN and input current IIN generated during the APM control process of FIG. 6. In the APM mode of operation, the values for the input voltage VIN and input current IIN dither around some intermediate value that corresponds to the true values for VIN and IIN that result in maximum power from the AC adapter 16. This is seen in FIGS. 7A and 7B for the APM mode of operation on the right in FIG. 7A and on the left in FIG. 7B. Operation in another mode of operation, namely the constant voltage CV mode, is also shown in FIGS. 7A and 7B. As seen in the figures, during the CV mode of operation the CV control module 42 and PWM controller 40 as seen in FIG. 2 control the DC-to-DC converter 29 (FIG. 1) to provide a constant output current $I_{OUT}$ at a constant output voltage $V_{OUT}$ and accordingly the input voltage VIN and input current IIN have corresponding substantially constant values as seen in FIGS. 7A and 7B. In this situation the AC adapter 16 is able to supply the input current IIN required for the charge control circuit 12 (FIG. 1) to supply the desired constant output current $I_{OUT}$ and constant output voltage $V_{OUT}$. Then in FIG. 7A, some event at time t0, such as a burst current required by the system load 20 (FIG. 1), occurs and the output current IOUT exceeds the current that can be supplied by the AC adapter 16. As a result, the input voltage VIN "collapses" or begins to decrease at time t0, resulting in the APM module 50 commencing operation in the APM mode a delay time later at time t1. The input voltage VIN and current IIN dither during this mode as already discussed. At some point later in time, the burst current required by the system load 20 terminates. This is seen in FIG. 7B at time t0. As a result, the charge control circuit 12 then commences operation in the CV mode once again in this example, which occurs at a time t1 in FIG. 7B.

Figure 8:
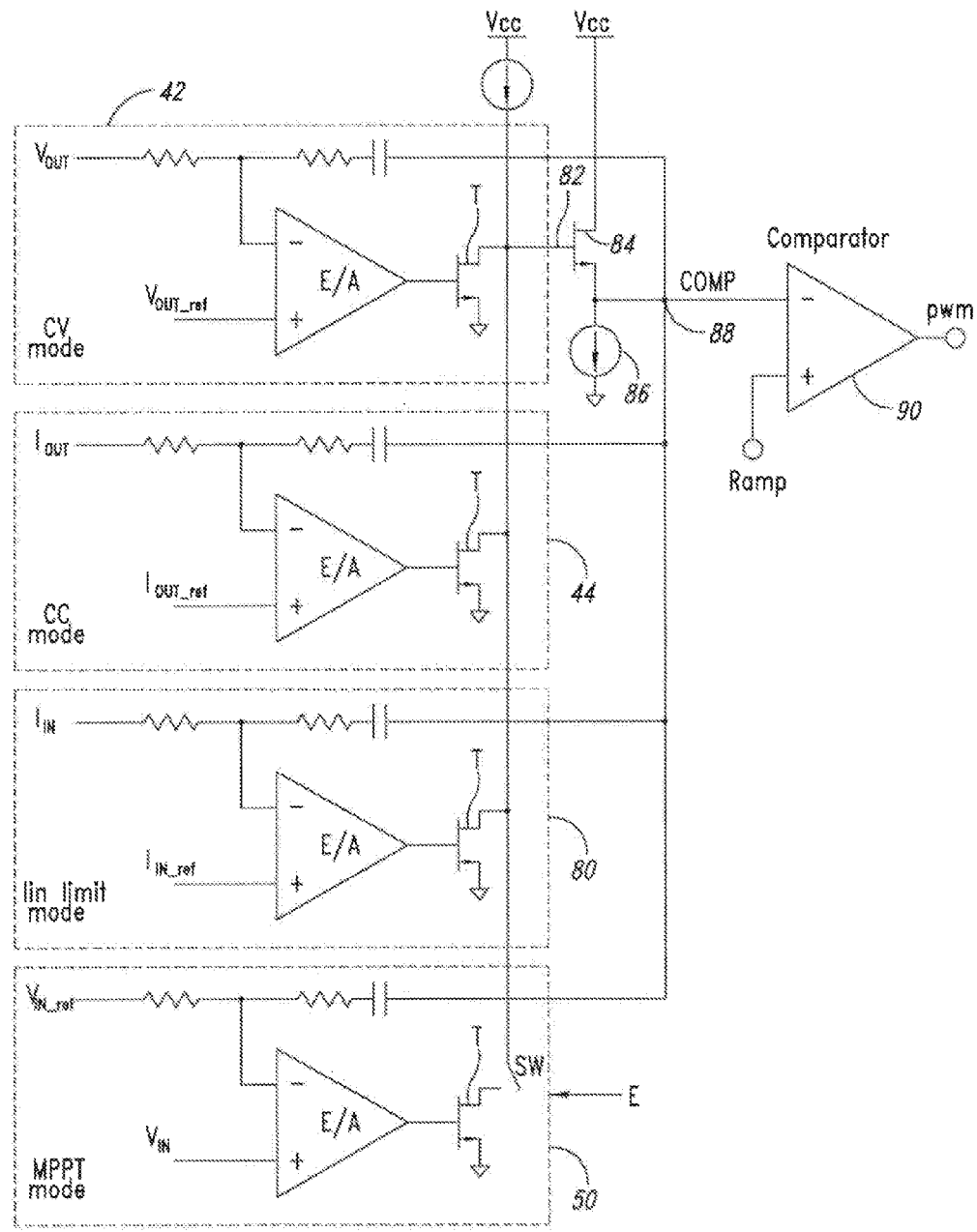
FIG. 8 is a functional schematic diagram that illustrates in more detail the operation of the adaptive charge controller of FIG. 2 according to one embodiment of the present invention.

FIG. 8 is a functional schematic diagram that illustrates in more detail the operation of the adaptive charge controller 28 of FIG. 2 according to one embodiment of the present invention. The adaptive charge controller 28 switches the operation of the charge control unit 12 among these different operating modes during operation. In the example of FIG. 8 the CV control module 42, CC control module 44, and APM control module 50 are shown, in addition to a new input-current-limit control module 80. More or fewer control modules can be included in other embodiments, such as the TR and SPPM control modules 46, 28 of FIG. 2, but only those shown in FIG. 8 are discussed now with reference to FIG. 8.

FIG. 8 shows one approach to determining which operating mode takes precedence in controlling the mode of operation of the charge control unit 12 (FIG. 1). As seen in FIG. 8, each control module 42, 44, 50 and 80 includes a corresponding error amplifier E/A that drives a corresponding output transistor T connected between ground and a common output node 82. The input-current-limit control module 80 also include a switch SW that is operable to selectively isolate or couple the corresponding output transistor T to the common output node 82 in response to the enable signal E generated by the comparator 58 in FIG. 4, as will be described in more detail below.

Each control module 42, 44, 50 and 80 receives a corresponding threshold or reference signal and a monitored or sensed operating parameter. More specifically, the CV control module 42 receives an output voltage reference $V_{OUT-REF}$ and also senses the output voltage $V_{OUT}$. The CC control module 44 receives an output current reference $I_{OUT-REF}$ and also senses the output current $I_{OUT}$ while the APM module 50 senses the input voltage $V_{IN}$ and receives an input voltage reference $V_{IN-REF}$. Finally, the input-current-limit control module 80 senses input current $I_{IN}$ and an input current reference $I_{IN-REF}$. When the input current $I_{IN}$ exceeds the input current reference $I_{IN-REF}$, the error amplifier E/A and the control module 80 generates an output that causes the PWM controller 40 (FIG. 2) to control the Buck converter 29 (FIG. 1) to limit the value of the input current and in this way protect the AC adapter 16.

As seen in FIG. 8, the outputs of the error amplifiers E/A are connected in a wired-OR configuration to the output node 82, such that the error amplifier turning ON its corresponding output transistor T the "hardest" or the most controls the level of the voltage on the output node. The common output transistor 84 is controlled by the voltage on the output node 82 and is coupled in series with a constant current source 86 between a supply voltage $V_{CC}$ and ground. The interconnection of the common output transistor 84 and constant current source 86 defines a comparison node 88 that is coupled to one input of a comparator 90, with the other input of the comparator receiving a ramp or sawtooth signal. The comparator 90 generates a PWM output signal in response to the ramp signal and voltage on the comparison node 88.

In operation, the error amplifier E/A turning ON its corresponding output transistor T the hardest controls the level of the voltage on the output node 82 which, in turn, determines the extent to which the common output transistor 84 turns ON. The extent to which the common output transistor 84 turns ON determines the voltage level on the comparison node 88. The constant current source 86 discharges the comparison node 88 at a fixed rate and thus discharges the comparison node while current flowing from the supply voltage $V_{CC}$ through the transistor 84 charges the comparison. The voltage level on the comparison node 88 is thus determined by the extent to which the transistor 84 is turned ON and thus by the current flowing through this transistor. As a result, the error amplifier E/A turning ON its corresponding output transistor T the hardest controls the level of the voltage on the output node 82 which, in turn, determines the extent to which the common output transistor 84 turns ON and in this way determines the voltage level on the comparison node 88. The voltage level on the comparison node, of course, determines the duty cycle of the PWM signal generated by the comparator 90.

The following example is now described to illustrate the overall operation of the control modules 42, 44, 50 and 80 in combination to provide overall control of the charging system 10 of FIG. 1. Assume that initially the chargeable power source 22 is almost completely discharged, meaning that the charge control unit 12 is supplying a relatively large output current IOUT including the charging current ICH to charge the chargeable power source and the load current IL being supplied to the system load 20. In such a situation, the required output current IOUT could be greater than the input current IIN that the AC adapter 16 can supply. Allowing the AC adapter 16 to provide such a high input current IIN would overload the AC adapter, possibly damaging or destroying the adapter. In this situation, the input-current-limit control module 80 senses the extremely high input current IIN so that this control module determines the voltage level on the common output node 82 and, in turn, the voltage level on the comparison node 88 to thereby control the PWM signal generated by the comparator 90. The resulting PWM signal limits the input current IIN drawn from the AC adapter 16. This input current IIN is utilized to provide the required load current IL to the system load 20 and the residual current (IIN–IL=ICH) is utilized as the charge current ICH to charge the chargeable power source 22. The adaptive charge controller 28 controls the transistor T in FIG. 1 to set the charge current ICH to a permissible value.

Now assume the system load 20 and/or the chargeable power source 22 demands less current, meaning that output current IOUT is now lower. Further assume that the AC adapter 16 can now supply the required output current IOUT. In this situation, the CC control module 44 may now take control of the overall operation, meaning that this control module drives the common output node 88 to control the voltage level on this note that and in this way control the voltage level on the comparison node 88 and thereby the PWM signal generated by the comparator 90. In this way, the CC control module 44 causes the adaptive charge controller 28 to operate such that a constant output current IOUT is supplied, with a portion of that being the charge current ICH to charge the chargeable power source 22 and a portion being the load current IL power the system load 20.

Now assume that after a time the chargeable power source 22 is nearly fully charged, meaning that the required charge current ICH decreases accordingly. As a result, the value of the required output current IOUT goes down and at this point the CV control module 42 takes control by determining the voltage level on the common output node 82 and thereby the voltage level on the comparison node 88. The CV control module 42 in this way controls the PWM signal generated by the comparator 90 to maintain output voltage VOUT at a substantially constant value at the required output current IOUT.

The APM module 50 similarly takes control of the overall operation and controls the system 10 in the MPPT mode when the input voltage VIN drops below the corresponding reference value VIN-REF and when the enable signal E is active to close the switch SW. When the MPPT mode is activated, the APM module 50 operates as previously described to adjust the input voltage VIN and input current IIN to thereby draw maximum power from the AC adapter 16. In this way, the chargeable power source 22 is provided with the maximum current available from the AC adapter 16 without causing an overload of the AC adapter. In operation of the APM module 50 in controlling the overall operation in the MPPT mode, if the resulting input current IIN exceeds the input current limit reference IIN-REF of the input-current-limit control module 80, then the input-current-limit control module takes over overall operation of the charging system 10. So during operation of the APM module 50 in the MPPT mode, the APM module may, in an attempt to maximize the power being drawn from the AC adapter 16, adjusts the input voltage and thereby cause and increase in the input current IIN that reaches the input current limit reference IIN-REF of the input-current-limit control module 80. When this happens, the input-current-limit control module 80 takes control of the overall operation and the APM module 50 is disabled (i.e., the enable signal E is driven inactive to open the switch SW).

Figure 9:
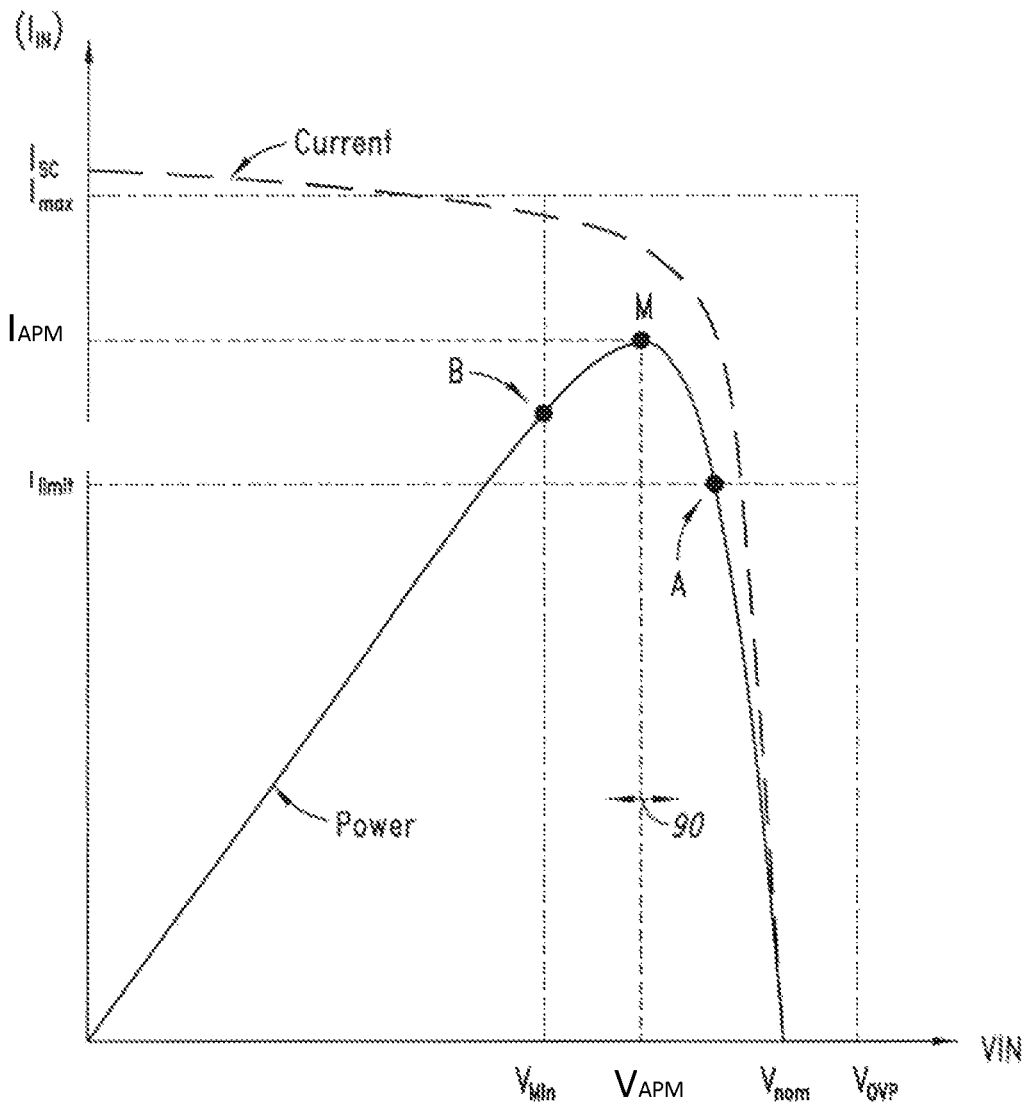
FIG. 9 is a graph of input current, input voltage, and input power showing operation of the adaptive charge controller of FIG. 2 in the MPPT mode to draw maximum power from the AC adapter of FIG. 1 according to one embodiment of the present invention.

FIG. 9 is a graph of input current, input voltage, and input power for operation of the adaptive charge controller 28 of FIG. 2 in the MPPT mode to draw maximum power from the AC adapter 16 of FIG. 1 according to one embodiment of the present invention. The corresponding power PIN=VIN×IIN is also shown in the figure. In operation, the APM module 50 controls the operation of the adaptive charge controller 28 of FIG. 1 so that the charging system 10 operates at the point M shown in FIG. 9. At this point, the AC adapter 16 supplies input current IIN that is equal to IAPM at an input voltage VIN that is equal to VAPM, resulting in maximum power at the point M being supplied by the AC adapter. Other points of operation A and B are also shown in FIG. 9 for the sake of comparison. The point A corresponds to the point where the AC adapter 16 would operate when the charging system 10 is operating in the input-current-limiting (i.e., see module 80 of FIG. 8) mode of operation. The point B corresponds to the point where the AC adapter may operate with conventional input dynamic power management IDPM such as discussed for the control module 54 of FIG. 3. The points M, A and B are shown on the graph of input power PIN and it is seen from the graph that point M results in greater input power PIN than either points A or B, and point M is the maximum power point of the AC adapter 16. An arrow 90 in FIG. 9 illustrates how the input voltage VIN varies or dithers about the maximum power point M during operation of the adaptive charge controller 28 in the MPPT mode as previously discussed with reference to the input voltage VIN and current IIN and FIGS. 3-6.

One skilled in the art will understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A charger, comprising:
an input,
at least one switch having a first node coupled to a reference voltage,
a current sensor coupled between the input and a second node of the at least one switch,
an output coupled to a third node of the at least one switch, and
a charge controller coupled to the input and configured to determine an input voltage, coupled to the current sensor and configured to determine an input current, and coupled to control inputs of the at least one switch, the at least one switch responsive to control signals supplied by the charge controller to the control inputs thereof to control voltage and current at the output of the charger, the charge controller configured to produce the control signals in response to the input voltage and the input current in a manner that approximately maximizes electrical power drawn at the input by causing the electrical power drawn at the input to dither around a maximum value of the electrical power drawn at the input by causing one of the input voltage and the input current to change in a direction, comparing a post-change value of the electrical power drawn at the input to a pre-change value of the electrical power drawn at the input, causing the one of the input voltage and the input current to change again in the direction if the post-change value is greater than the pre-change value, and causing the one of the input voltage and the input current to change in an opposite direction if the post-change value is less than the pre-change value.

2. The charger of claim 1 further comprising a filter coupled between the output and the third node of the at least one switch.

3. The charger of claim 1 wherein the charger controller has a plurality of operating modes including a dynamic power management mode during which electrical power demand at the input exceeds electrical power available at the input, the charge controller configured in the dynamic power management mode to produce the control signals based on a reference control signal, and wherein the charge controller comprises an adaptive power management unit which is configured to produce the reference control signal, the adaptive power management unit configured to respond to the input voltage and the input current by varying the reference control signal in a manner that approximately maximizes the electrical power drawn at the input by causing the electrical power drawn at the input to dither around the maximum value of the electrical power drawn at the input by causing one of the input voltage and the input current to change in a direction, comparing a post-change value of the electrical power drawn at the input to a pre-change value of the electrical power drawn at the input, causing the one of the input voltage and the input current to change again in the direction if the post-change value is greater than the pre-change value and causing the one of the input voltage and the in out current to change in an opposite direction if the post-change value is less than the pre-change value.

4. The charger of claim 1 wherein the charge control controller is fabricated entirely using analog circuitry.

5. A charger, comprising:
an input,
at least one switch having a first node coupled to a reference voltage,
a current sensor coupled between the input and a second node of the at least one switch,
an output coupled to a third node of the at least one switch, and
a charge controller coupled to the input and configured to determine an input voltage, coupled to the current sensor and configured to determine an input current and coupled to control inputs of the at least one switch, the at least one switch responsive to control signals supplied by the charge controller to the control inputs thereof to control voltage and current at the output of the charger, the charge controller configured to produce the control signals in response to the input voltage and the input current in a manner that approximately maximizes electrical power drawn at the input, wherein the charger controller has a plurality of operating modes including a dynamic power management mode during which electrical power demand at the input exceeds electrical power available at the input, the charge controller configured in the dynamic power management mode to produce the control signals based on a reference control signal, wherein the charge controller comprises an adaptive power management unit which is configured to produce the reference control signal, the adaptive power management unit configured to respond to the input voltage and the input current by varying the reference control signal in a manner that approximately maximizes electrical power drawn at the input, and wherein the adaptive power management unit comprises
- a first analog adaptive gain circuit having an input receiving the input voltage and an output producing an adjusted voltage as a product of the input voltage and a first gain value,
- a second analog adaptive gain circuit having an input receiving the input current and an output producing an adjusted current as a product of the input current and a second gain value,
- a first converter for converting the adjusted voltage to a discrete voltage value and converting the adjusted current to a discrete current value,
- a multiplier circuit for producing an input power value as a product of the discrete voltage value and the discrete current value,
- a comparison circuit for producing a step value proportional to a difference between the input power value and a previously determined input power value, and
- a second converter for converting the step value to the reference control signal.

6. The charger of claim 5 wherein the first analog adaptive gain circuit is responsive to the discrete voltage value to adjust the first gain value such that the discrete voltage value is between predefined low and high values.

7. The charger of claim 5 wherein the second analog adaptive gain circuit is responsive to the discrete current value to adjust the second gain value such that the discrete current value is between predefined low and high values.

8. The charger of claim 5 wherein the first and second analog adaptive gain circuits each comprise analog signal filtering circuitry.

9. The charger of claim 5 wherein the comparison circuitry includes one or more memory registers for storing the input power value therein for comparison with a subsequently determined input power value.

10. A charging system, comprising:
an adapter for converting AC electrical power to a DC electrical power, wherein a DC voltage produced by the adapter decreases rapidly as a DC current produced by the adapter increases above a rated current value,
an electronic device having a power input coupled to at least one electrically chargeable source and to at least one electrical circuit defining a system load, and
a charge control unit having an input coupled to the adapter, an output coupled to the power input of the electronic device, a sensor for sensing the DC current produced by the adapter and producing a current-sense signal, and switching circuitry coupled between the charge control unit input and output and responsive to control signals produced by the charge control unit to controllably supply the DC voltage and the DC current from the adapter to the charge control unit, the charge control unit configured, responsive to the DC voltage produced by the adapter and to the current-sense signal, when a DC current demanded by the electronic device exceeds the rated current, to produce the control signals in a manner that approximately maximizes the DC electrical power produced by the adapter by causing the DC electrical power produced by the adapter to alternate between two values of a curve that represents the DC electrical power produced by the adapter and that includes a maximum value between the two values of the curve by causing one of the DC voltage and the DC current to change in a direction, comparing a post-change value of the DC electrical power to a pre-change value of the DC electrical power, causing the one of the DC voltage and the DC current to change again in the direction if the post-change value is greater than the pre-change value, and causing the one of the DC voltage and the DC current to change in an opposite direction if the post-change value is less than the pre-change value.

11. The charging system of claim 10 wherein the charge control unit is configured, responsive to the DC voltage produced by the adapter and to the current signal, when the DC voltage produced by the adapter drops below a predefined voltage value following demand by the charge control unit of DC current in excess of the rated current, to produce the control signals in a manner that maximizes the DC electrical power produced by the adapter by causing the DC electrical power produced by the adapter to alternate between the two values of the curve by causing one of the DC voltage and the DC current to change in a direction, comparing a post-change value of the DC electrical power to a pre-change value of the DC electrical power, causing the one of the DC voltage and the DC current to change again in the direction if the post-change value is greater than the pre-change value, and causing the one of the DC voltage and the DC current to change in an opposite direction if the post-change value is less than the pre-change value.

12. The charging system of claim 10 wherein the charge control unit comprises a charge controller producing the control signals, the charge controller having a plurality of operating modes including a dynamic power management mode during which the DC current demanded by the charge control unit exceeds the rated current, the charge controller operable in the dynamic power management mode to produce the control signals based on a reference control signal,
and wherein the charge controller comprises an adaptive power management unit which produces the reference control signal, the adaptive power management unit responsive to the DC voltage produced by the adapter and to the current signal to vary the reference control signal in a manner that maximizes the DC electrical power produced by the adapter by causing the DC electrical power produced by the adapter to alternate between the two values of the curve by causing one of the DC voltage and the DC current to change in a direction, comparing a post-change value of the DC electrical power to a pre-change value of the DC electrical power, causing the one of the DC voltage and the DC current to change again in the direction if the post-change value is greater than the pre-change value, and causing the one of the DC voltage and the DC current to change in an opposite direction if the post-change value is less than the pre-change value.

13. A charging system, comprising:

an adapter for converting AC electrical power to a DC electrical power, wherein a DC voltage produced by the adapter decreases rapidly as a DC current produced by the adapter increases above a rated current value, an electronic device having a power input coupled to at least one electrically chargeable source and to at least one electrical circuit defining a system load, and a charge control unit having an input coupled to the adapter, an output coupled to the power input of the electronic device, a sensor for sensing the DC current produced by the adapter and producing a current-sense signal, and switching circuitry coupled between the charge control unit input and output and responsive to control signals produced by the charge control unit to controllably supply the DC voltage and the DC current from the adapter to the charge control unit, the charge control unit responsive to the DC voltage produced by the adapter and to the current signal, when the DC current demanded by the electronic device exceeds the rated current to produce the control signals in a manner that approximately maximizes the DC electrical power produced by the adapter, wherein the charge control unit comprises a charge controller producing the control signals, the charge controller having a plurality of operating modes including a dynamic power management mode during which the DC current demanded by the charge control unit exceeds the rated current, the charge controller operable in the dynamic power management mode to produce the control signals based on a reference control signal, wherein the charge controller comprises an adaptive power management unit which produces the reference control signal, the adaptive power management unit responsive to the DC voltage produced by the adapter and to the current signal to vary the reference control signal in a manner that maximizes the DC electrical power produced by the adapter, and wherein the adaptive power management unit comprises a first analog adaptive gain circuit having an input receiving the DC voltage produced by the adapter and an output producing an adjusted voltage as a product of the DC voltage produced by the adapter and a first gain value, a second analog adaptive gain circuit having an input receiving the current signal and an output producing an adjusted current as a product of the current signal and a second gain value, a first converter for converting the adjusted voltage to a discrete voltage value and converting the adjusted current to a discrete current value, a multiplier circuit for producing an input power value as a product of the discrete voltage value and the discrete current value, a comparison circuit for producing a step value proportional to a difference between the input power value and a previously determined input power value, and a second converter for converting the step value to the reference control signal.

14. The charging system of claim 13 wherein the first analog adaptive gain circuit is responsive to the discrete voltage value to adjust the first gain value such that the discrete voltage value is between predefined low and high values, and wherein the second analog adaptive gain circuit is responsive to the discrete current value to adjust the second gain value such that the discrete current value is between the predefined low and high values.

15. A method of supplying DC electrical power from an adapter to an electronic device, the adapter converting AC current and voltage to DC current and voltage, wherein the DC voltage produced by the adapter decreases rapidly as the DC current produced by the adapter increases above a rated current value, the method comprising:

monitoring one of the DC voltage and the DC current produced by the AC adapter, and if the DC voltage is monitored and drops below a predefined voltage or if the DC current is monitored and exceeds the rated current, approximately maximizing an electrical power supplied by the adapter by adaptively controlling levels of the DC voltage and the DC current supplied by the adapter to the electronic device such that the electrical power supplied by the adapter dithers around a maximum electrical power that the adapter can supply under a present load condition by causing one of the DC voltage and the DC current to change in a direction, comparing a post-change value of the electrical power to a pre-change value of the electrical power, causing the one of the DC voltage and the DC current to change again in the direction if the post-change value is greater than the pre-change value, and causing the one of the DC voltage and the DC current to change in an opposite direction if the post-change value is less than the pre-change value.

16. A method of supplying DC electrical power from an adapter to an electronic device, the adapter converting AC current and voltage to DC current and voltage, wherein the DC voltage produced by the adapter decreases rapidly as the DC current produced by the adapter increases above a rated current value, the method comprising:

monitoring one of the DC voltage and the DC current produced by the AC adapter, if the one of the monitored DC voltage and the DC current drops below a predefined voltage or current, respectively, and the monitored DC current exceeds the rated current, adaptively controlling a level of at least one of the DC voltage and the DC current supplied by the adapter to the electronic device in a manner that approximately maximizes the DC electrical power supplied by the adapter, wherein adaptively controlling a level of at least one of the DC voltage and the DC current supplied by the adapter to the electronic device comprises repeatedly executing the steps of measuring the DC current supplied by the adapter and producing an analog current signal corresponding thereto, sampling the DC voltage and the analog current signal, computing a supply power as a function of the sampled DC voltage and the sampled analog current signal, determining a tracking direction toward the greater of the supply power and a most recent previous supply power value stored in memory, adjusting a reference control signal based on the tracking direction, and controlling the level of the at least one of the DC voltage and the DC current supplied by the adapter to the electronic device based on the reference control signal.

17. The method of claim 16 further comprising:

amplifying the DC voltage produced by the adapter by a voltage gain value, and amplifying the analog current signal by a current gain value, and wherein sampling the DC voltage and the analog current signal comprises sampling the amplified DC voltage and the amplified analog current signal.

18. The method of claim 17 further comprising, prior to adjusting a reference control signal:

if the sampled DC voltage is not between predetermined low and high values, repeatedly modifying the voltage gain value as a function of the sampled DC voltage and sampling the DC voltage amplified by the modified voltage gain value until the value of the sampled DC voltage is between the predetermined low and high values, if the sampled analog current signal is not between the predetermined low and high values, repeatedly modifying the current gain value as a function of the sampled analog current signal and sampling the analog current signal amplified by the modified current gain value until the value of the sampled analog current signal is between the predetermined low and high values, computing a previous supply power value as a function of the most recently sampled DC voltage and the most recently sampled analog current signal, and storing the previous supply power value in memory.

19. The method of claim 17 wherein the method further comprises delaying for a predefined time period between each iteration of execution of the combination of measuring the DC current, amplifying the DC voltage, amplifying the analog current signal, sampling the amplified DC voltage and the amplified analog current signal, computing the supply power, determining the tracking direction and adjusting the reference control signal.

20. The method of claim 19 further comprising an adaptive power management circuit including electrical circuitry for amplifying the DC voltage, for amplifying the analog current signal, for sampling the amplified DC voltage and the amplified analog current signal, for computing the supply power, for determining the tracking direction, and for adjusting the reference control signal, and wherein the method further comprises shutting down the adaptive power management circuit during the predefined time period to conserve electrical power use by the adaptive power management circuit during the predefined time period.

* * * * *

UNITED STATES PATENT AND TRADEMARK OFFICE
CERTIFICATE OF CORRECTION

PATENT NO.        : 9,564,772 B2                                        Page 1 of 1
APPLICATION NO.   : 13/456187
DATED             : February 7, 2017
INVENTOR(S)       : Qiu et al.

It is certified that error appears in the above-identified patent and that said Letters Patent is hereby corrected as shown below:

In the Claims

At Claim 3, Column 18, Line 50, replace "the in out" with --the input--.

Signed and Sealed this
Second Day of May, 2017

Michelle K. Lee
*Director of the United States Patent and Trademark Office*